M. HALSTED & J. L. WHEELER.
Putting up and Preserving Cider.
No. 136,914.            Patented March 18, 1873.
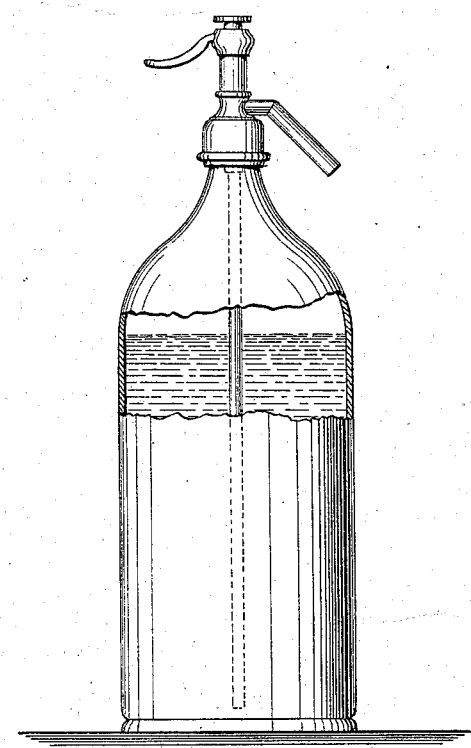
Witnesses:
Sedgwick
Alex F. Roberts
Inventor:
M. Halsted
J. L. Wheeler
Per
Attorneys.
AM. PHOTO-LITHOGRAPHIC CO. N.Y. (OSBORNE'S PROCESS.)

UNITED STATES PATENT OFFICE.

MOSES HALSTED AND JOHN L. WHEELER, OF BROOKLYN, NEW YORK, ASSIGNORS TO HALSTED, COUSE & CO., OF NEW YORK CITY.

IMPROVEMENT IN PUTTING UP AND PRESERVING CIDER.

Specification forming part of Letters Patent No. 136,914, dated March 18, 1873.

*To all whom it may concern:*

Be it known that we, MOSES HALSTED and JOHN L. WHEELER, of Brooklyn, in the county of Kings and State of New York, have invented a new and useful Method of Putting up and Preserving Cider; and we do hereby declare the following to be a full, clear, and exact description of the same.

The invention relates to methods of arresting fermentation and in preserving the fruity flavor of cider, so that it may be offered to the public pure and without sediment. The method by which we accomplish this will first be fully described in connection with all that is necessary to a full understanding thereof, and then the article made and the process of making it distinctly claimed.

Ordinarily, pure cider undergoes a greater or less degree of fermentation after it has been bottled. This has the effect to generate the desired carbonic acid, but at the same time it produces a deposit which is generally esteemed to be the visible characteristic distinction between pure and chemically-prepared cider. This deposit is, however, very objectionable when visible in the glass from which it is to be drank and into which it has been poured, marring its appearance and causing persons of fastidious taste to reluct at drinking it. This, however, is not the greatest objection, since this bottle-fermentation entirely removes the peculiar flavor which distinguishes the pure juice of the apple, and, like the aroma of coffee, once lost, can never be regained. On account of this sediment and the flat taste which is soon acquired in the ordinary bottled cider, few persons care to sell it to the public. I have long studied how to overcome these serious objections, and to discover some means by which this beverage, so healthful when preserved with its natural taste and flavor, may be supplied to the public in perfect and salable condition. I have at last succeeded in making a discovery which has been practically tested and found fully to answer the object at which I have aimed.

My process is applicable to and tried only on the pure apple-juice which has been previously run into large tanks or casks in a cool underground cellar. Here it is charged with carbonic-acid gas. I then take the ordinary siphon-bottles, used for certain other liquids, one such being shown in the drawing, and connect them with the tank or cask, and carefully fill them. The air being excluded, and the carbonic-acid gas having been applied before the bottle fermentation, no deposit is made, and the native fruity taste of the cider is entirely preserved.

Separate drinks may be taken from the same bottle at the interval of several months without a perceptible change in the beverage.

Having thus described our invention, what we claim as new, and desire to secure by Letters Patent, is—

1. As an article of manufacture, a pure cider in siphon-bottles, charged with carbonic-acid before the bottle fermentation and deposit has taken place, as and for the purpose described.

2. The process of preparing pure cider so as to preserve its good qualities by charging it with carbonic-acid gas, in the manner and for the purpose set forth.

MOSES HALSTED.
JOHN L. WHEELER.

Witnesses:
A. P. THAYER.
T. B. MOSHER.